United States Patent [19]
Bardmesser

[11] Patent Number: 6,020,937
[45] Date of Patent: Feb. 1, 2000

[54] HIGH RESOLUTION DIGITAL PROJECTION TV WITH DYNAMICALLY ADJUSTABLE RESOLUTION UTILIZING A SYSTEM OF ROTATING MIRRORS

[75] Inventor: George S. Bardmesser, Woodcliff, N.J.

[73] Assignees: Sony Corporation, Tokyo, Japan; Sony Corporation of America, Park Ridge, N.J.

[21] Appl. No.: 08/854,872

[22] Filed: May 12, 1997

[51] Int. Cl.[7] .............................. G02F 1/00; H04N 3/223; G03B 21/26; G02B 26/08
[52] U.S. Cl. .......................... 348/756; 250/236; 348/747; 348/760; 353/37; 359/202; 359/204
[58] Field of Search ..................................... 348/202, 203, 348/204, 205, 750, 756, 759, 760, 745, 747; 353/37; 359/201, 202, 203, 204; 250/234–236

[56] References Cited

U.S. PATENT DOCUMENTS

| | | | |
|---|---|---|---|
| 3,864,730 | 2/1975 | Roth | 348/750 |
| 3,883,688 | 5/1975 | Greis et al. | 348/203 X |
| 4,479,144 | 10/1984 | Yamazaki et al. | |
| 4,827,334 | 5/1989 | Johnson et al. | 348/745 X |
| 4,868,668 | 9/1989 | Tavernetti | 348/745 |
| 5,006,705 | 4/1991 | Saito et al. | 250/235 |
| 5,148,285 | 9/1992 | Nakane et al. | |
| 5,170,181 | 12/1992 | Tamada | |
| 5,185,676 | 2/1993 | Nishiberi | 359/202 |
| 5,208,875 | 5/1993 | Virtue et al. | |
| 5,475,534 | 12/1995 | Okajima et al. | |
| 5,537,159 | 7/1996 | Suematsu et al. | |
| 5,687,020 | 11/1997 | Park et al. | 348/760 X |

Primary Examiner—John W. Miller
Attorney, Agent, or Firm—Jay H. Maioli

[57] ABSTRACT

A video display system includes a laser beam that is reflected from a vertical scan rotating mirror, then from a horizontal scan rotating mirror and then toward a viewing surface. The rotational angles of the mirrors and the intensity of the laser are controlled by a controller that is driven by a video signal. Rotation of the horizontal mirror scans the laser beam across the viewing surface while the laser intensity is modulated to form pixels on the viewing surface. The vertical scan mirror then directs the beam to the next horizontal scan line. The resolution and aspect ratio of the image are adjusted by changing the rotation rate of the mirrors and by changing the rate at which the laser is modulated.

8 Claims, 7 Drawing Sheets

HIGH RESOLUTION DIGITAL PROJECTION TV WITH DYNAMICALLY ADJUSTABLE RESOLUTION UTILIZING A SYSTEM OF ROTATING MIRRORS

BACKGROUND OF THE INVENTION

1. Field of the Invention

This invention relates generally to the field of projection television systems. More particularly, this invention relates to a projection television system where a modulated laser beam is scanned across a surface by rotating mirrors and where areas of the surface illuminated by the laser form pixels of a video image.

2. Description of Related Art

Projection screen video display systems are known. For example, projection screen televisions with a plurality of LCD light valves that individually control the transmission of red, green, and blue light sources are commercially available. An LCD light valve is placed in front of each of the three light sources, and color signals for red, green, and blue portions of a video image are used to drive the LCD associated with each respective light source. Lenses focus the transmitted light onto a viewing screen, so that the three color images are superimposed to form a full-color image.

Other known projection screen video systems use cathode ray tubes to generate an image that is then magnified by a system of lenses and projected onto a screen.

These systems suffer from the drawback that the resolution of the projected image is fixed by the manufactured resolution of the LCDs or the CRT. As a result, a system designed to display an NTSC format signal with a resolution of 640×480 and an aspect ration of 4×3 will not optimally display an HDTV signal using the SMTPE 240M standard with a resolution of 1920×1035 and an aspect ratio of 16×9.

OBJECTS AND SUMMARY OF THE INVENTION

In view of the above shortcomings of known projection screen display devices it is an object of the present invention to provide a display device with a dynamically variable resolution.

It is another object of the present invention to provide a projection screen display system wherein an image is produced by scanning a modulated laser beam across a display surface using rotating mirrors.

It is a further object of the present invention to provide a projection display device wherein alignment of optical components is performed automatically.

According to an aspect of the present invention, there is provided a modulated laser light source whose beam is reflected from two rotating mirrors. The arrangement of the mirrors and their rotational speeds are selected so that the beam is directed into a number of parallel horizontal lines scanned across a viewing surface. In synchronism with the scanning of the beam, the intensity of the light source is varied in correspondence with a video signal to produce a video display image on the viewing surface.

According to another aspect of the invention, there is provided a digital signal processor that modifies the rotational velocities and relative angular positions of rotating mirrors used to scan a laser light beam across a viewing surface so that when the intensity of the beam is modulated by a video signal with a preselected format and reflected from those mirrors a displayed image will appear at the proper resolution and aspect ratio for the preselected format on the viewing surface.

DETAILED DESCRIPTION OF PREFERRED EMBODIMENTS

Figure 1:
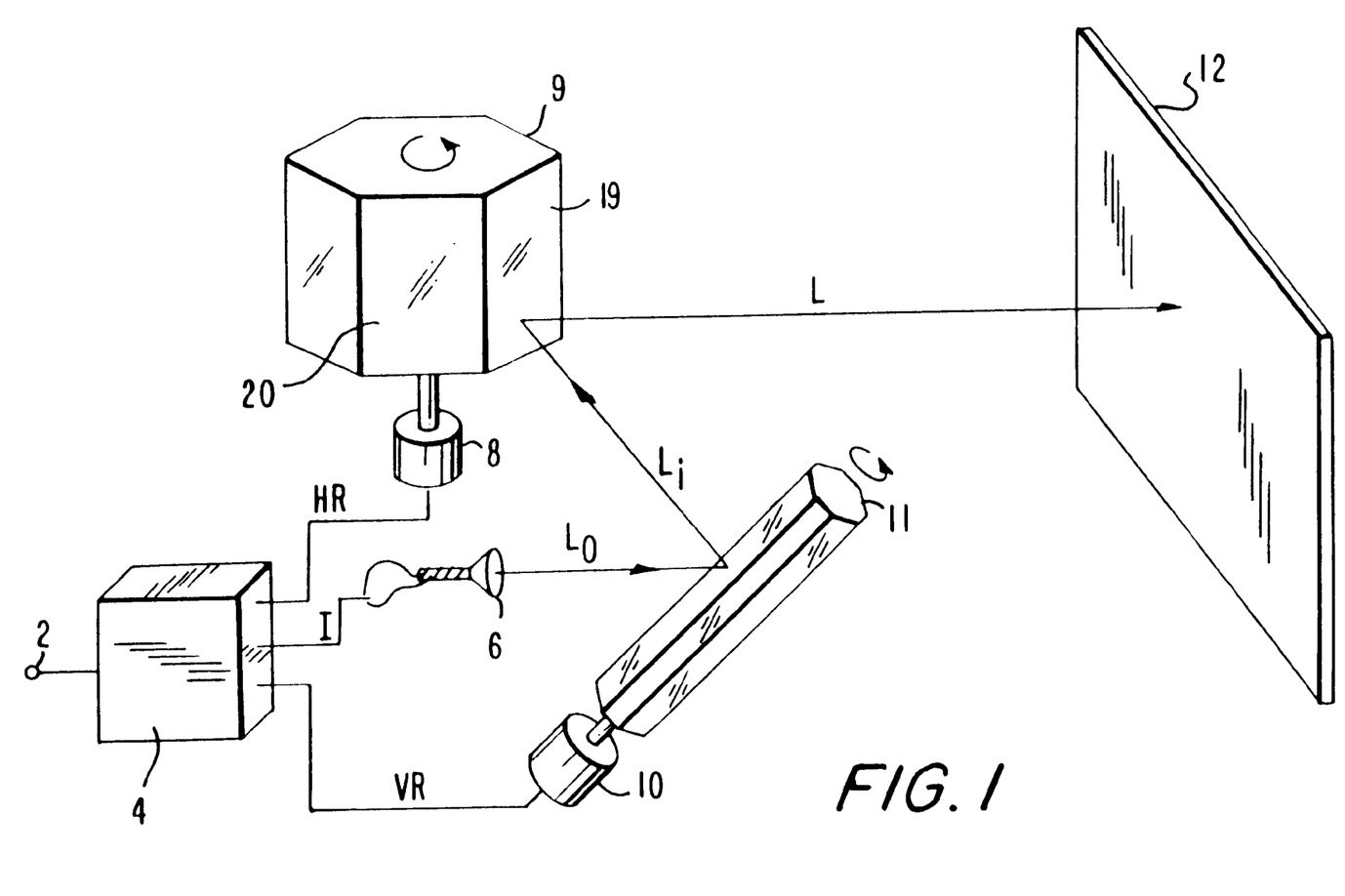
FIG. 1 shows a projection video display device according to a first embodiment of the present invention.

FIG. 1 shows a first embodiment of the present invention, in which a video signal is applied to an input terminal 2 of a controller 4. The controller 4 generates a modulated drive signal I that is used to drive a solid-state laser 6. The controller 4 also generates horizontal and vertical motor control signals, HR and VR, that drive a horizontal motor 8 and a vertical motor 10 that rotate a horizontal scan mirror 9 and a vertical scan mirror 11, respectively. A modulated beam L from the laser 6 is reflected from the vertical scan mirror 11 and the horizontal scan mirror 9 onto a viewing surface 12.

Figure 2A:
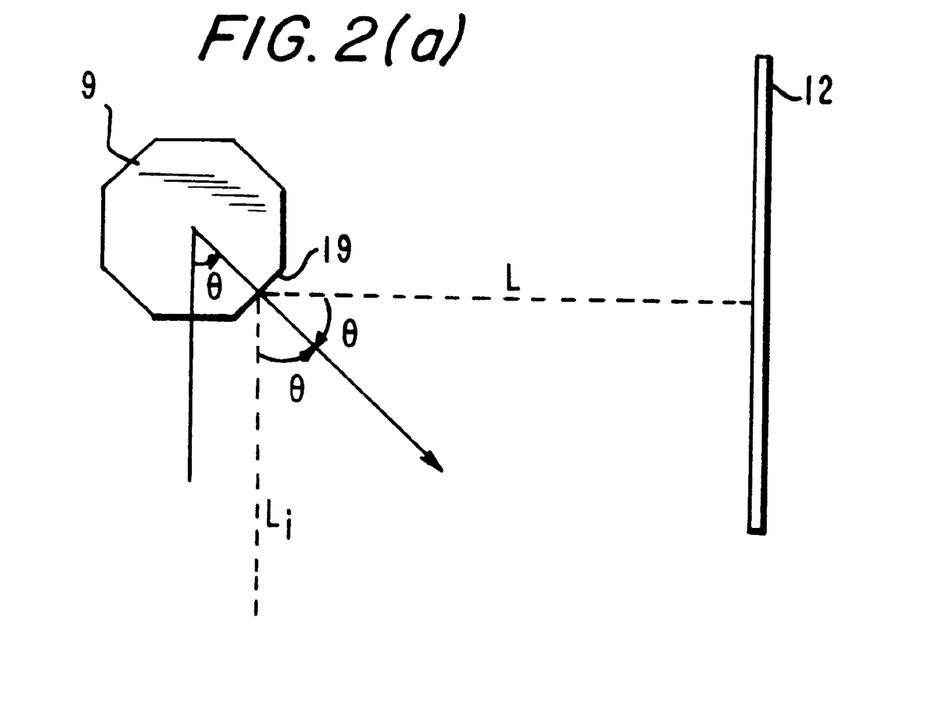
FIGS. 2(a), 2(b) and 2(c) show a detailed view of a horizontal scanning mirror according to the first embodiment of the present invention.

FIG. 2(a) shows the horizontal scan mirror 9 from above. An angle $\theta$ is defined as the angle between a line normal to a first face 19 of the mirror 9 and a line parallel to the incident light beam Li. The incident beam Li is reflected through an angle $\theta_1$ toward the screen 12. As the mirror 9 rotates through angles from $\theta_1$ shown in FIG. 2(b) to angle $\theta_2$ shown in FIG. 2(c) the beam L is scanned across the surface 12. The point on the first face of the mirror 19 where beam Li strikes the surface 19 moves from a leading edge of the surface 19, shown in FIG. 2(b), to a trailing edge, shown in FIG. 2(c).

Figure 2B:
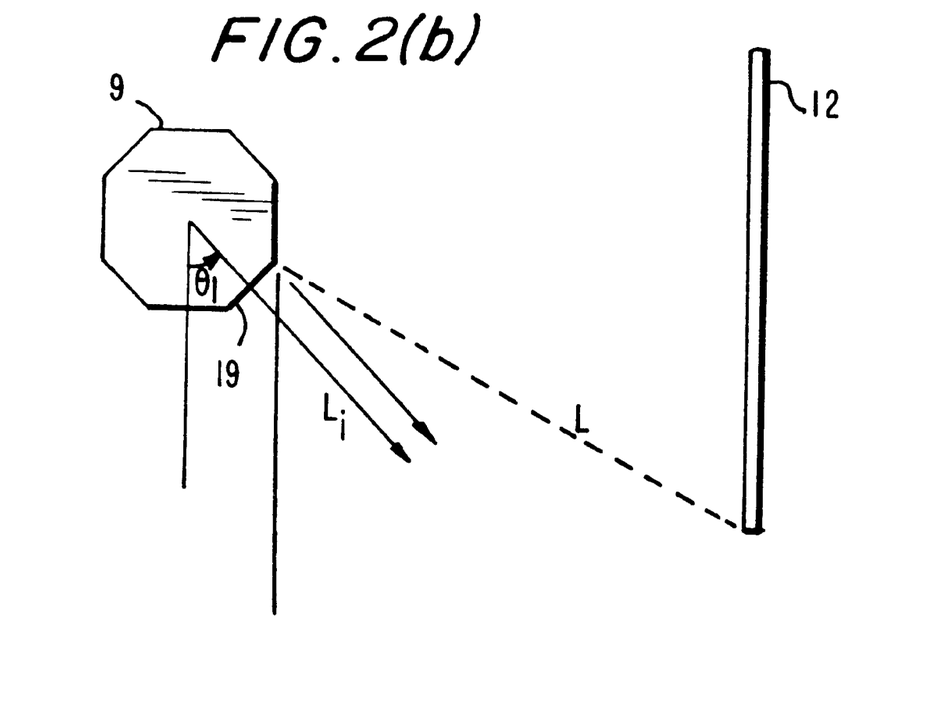

The mirror 9 continues to rotate until the beam Li strikes the next face of the mirror 20 that directs the beam back to the position shown in FIG. 2(b).

Figure 2C:
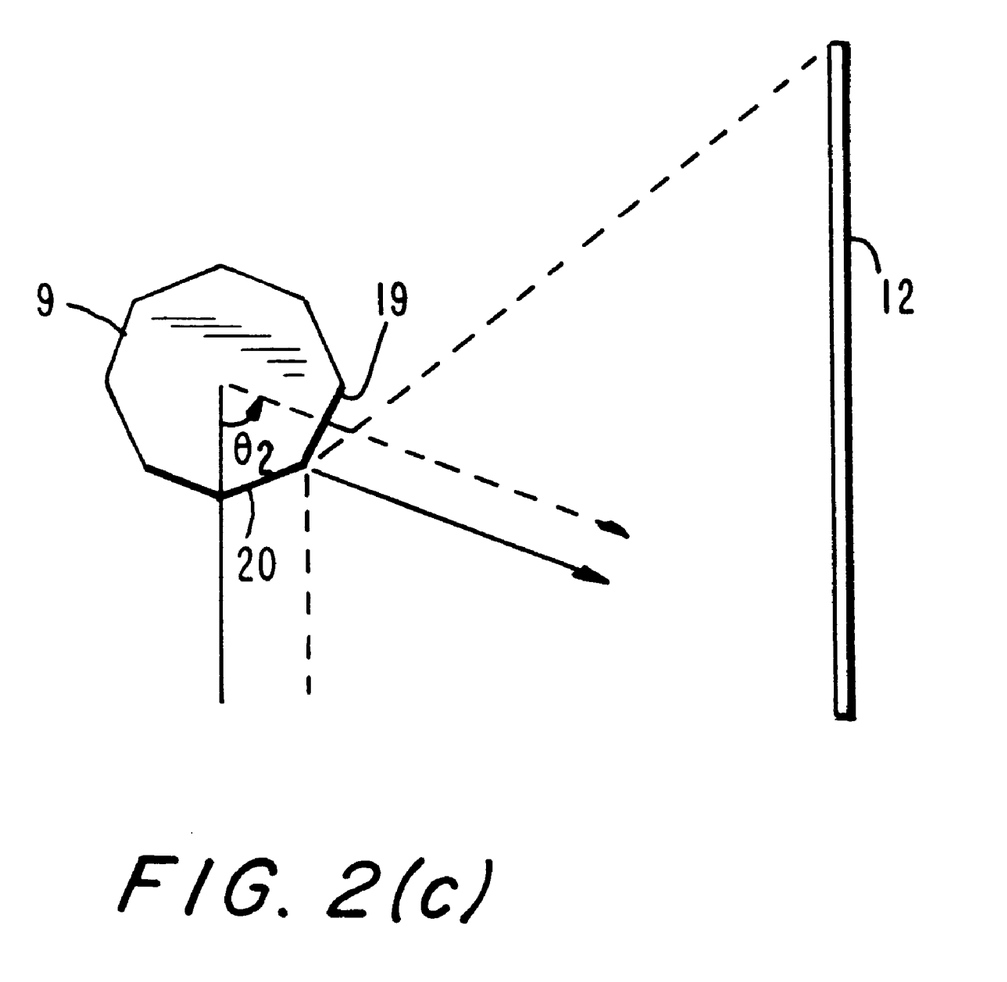

As the incident beam Li approaches the far edge of the first mirror face 19 as shown in FIG. 2(c) the controller 4 causes the laser 6 to turn off. This prevents light from being reflected toward the screen 12 during the transition between mirror faces 19 and 20, as shown in FIG. 2(c). As a result, the projected image on the screen 12 will not be distorted by manufacturing imperfections at the edges of the mirror faces 19, 20.

As shown in FIG. 1, the axis of the vertical scan mirror 11 is inclined at an angle from the axis of the horizontal mirror 9. Rotation of the vertical mirror 11 causes the reflected beam Li to move vertically along the face 19 of the horizontal mirror 9. Rotation of the mirrors 9, 11 is synchronized so that each horizontal scan of the beam shown in FIGS. 2(b) and 2(c) is displaced by a predetermined vertical separation.

The intensity of the beam L is modulated by the controller 4 as it is scanned across the surface 19 to generate an image on the screen 12. The rotational velocities of the mirrors 9, 11 and the modulation of the laser 6 are adjusted to allow projection of an image of a selected resolution and aspect ratio.

When an NTSC formatted signal is applied to input terminal 2, the rotational velocity of the horizontal mirror 9 is selected so that a complete video field is scanned 30 times each second. This velocity depends on the number of faces of the horizontal mirror 9 and the number of horizontal lines that must be scanned for each video field.

For an NTSC signal where 330 lines are scanned for each field, a horizontal mirror 9 with sixteen faces must have a rotational velocity of approximately 620 rotations per second.

Figure 3:
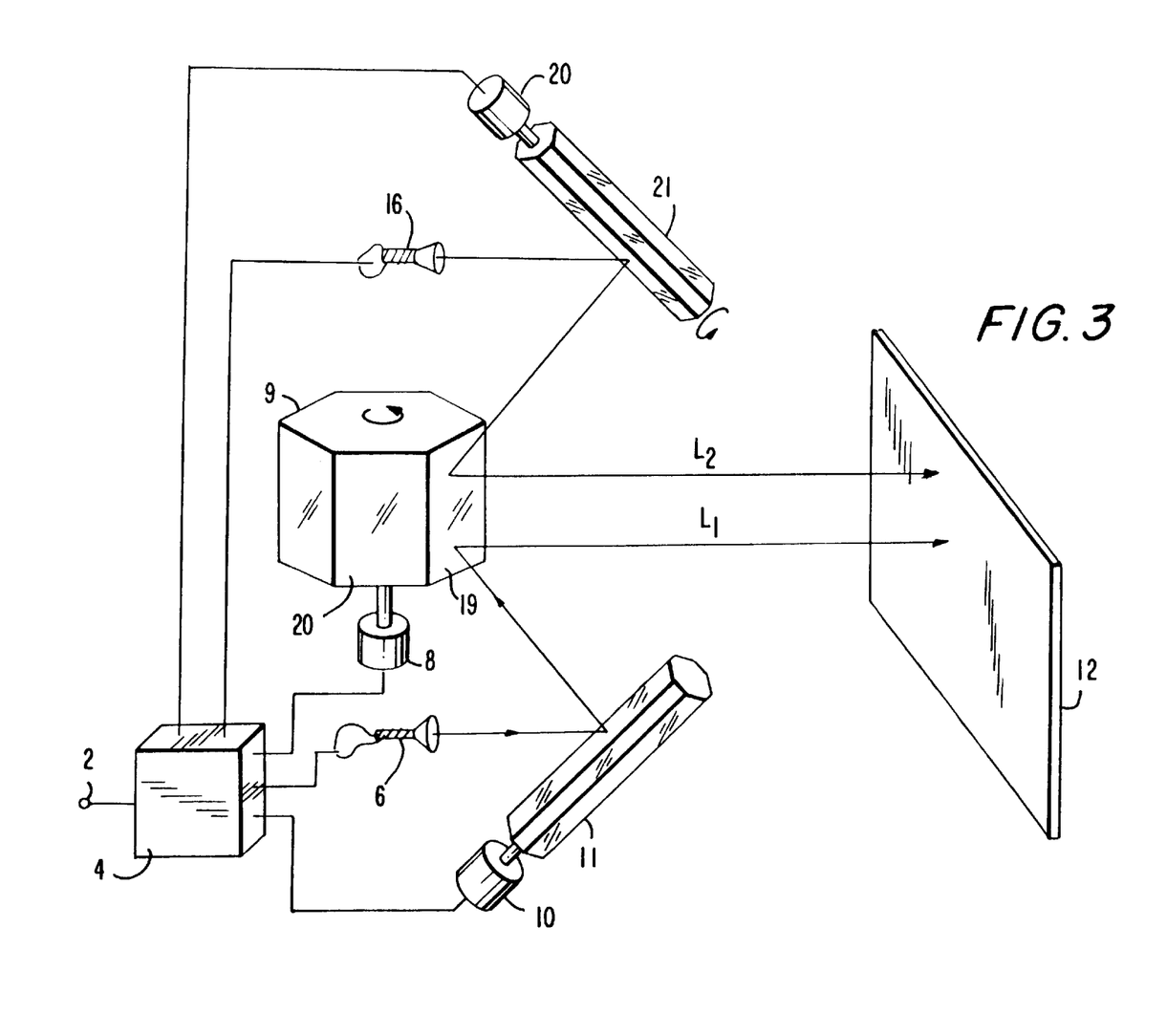
FIG. 3 shows a projection video display apparatus according to a second embodiment of the present invention.

FIG. 3 shows a second embodiment of the present invention where a second laser 16 is added to reduce the required rotation speed of the horizontal mirror 9. Light from the second laser 16 is reflected from a second vertical scan mirror 21. The second vertical scan mirror 21 is driven by a second vertical motor 20. The motor 20 is controlled by the controller 4 so that the two beams $L_1$ and L scan different sections of the viewing surface 12 while each of the lasers 6 and 16 is modulated with video data corresponding to that respective portion of the image. The two beams $L_1$ and $L_2$ are simultaneously scanned in the horizontal direction. By employing two lasers and a sixteen-sided horizontal scan mirror 9, the rotational velocity of the horizontal mirror 9 is reduced to approximately 310 rotations per second for an NTSC signal.

According to a third embodiment of the present invention the aspect ratio of the image projected on the viewing surface 12 may be adjusted by the controller 4 to accommodate a variety of video formats. As shown in FIGS. 2(a), 2(b) and 2(c), the maximum length of a scan line is determined by the angles $\theta_1$ and $\theta_2$. The placement of the mirrors 9, 11, laser 6, and viewing surface 12 shown in FIG. 1 are selected so that a desired width of the widest format aspect ratio is accommodated by angles $\theta_1$ and $\theta_2$. Similarly, the mirrors 9, 11, laser 6, and viewing surface 12 are placed to accommodate the tallest format to be displayed. The controller 4 then modulates the laser 6 so that the laser 6 is turned off for time periods when the rotational positions of the mirrors 9, 11 direct the light beam L outside the viewing area of the selected display format.

Figure 4:
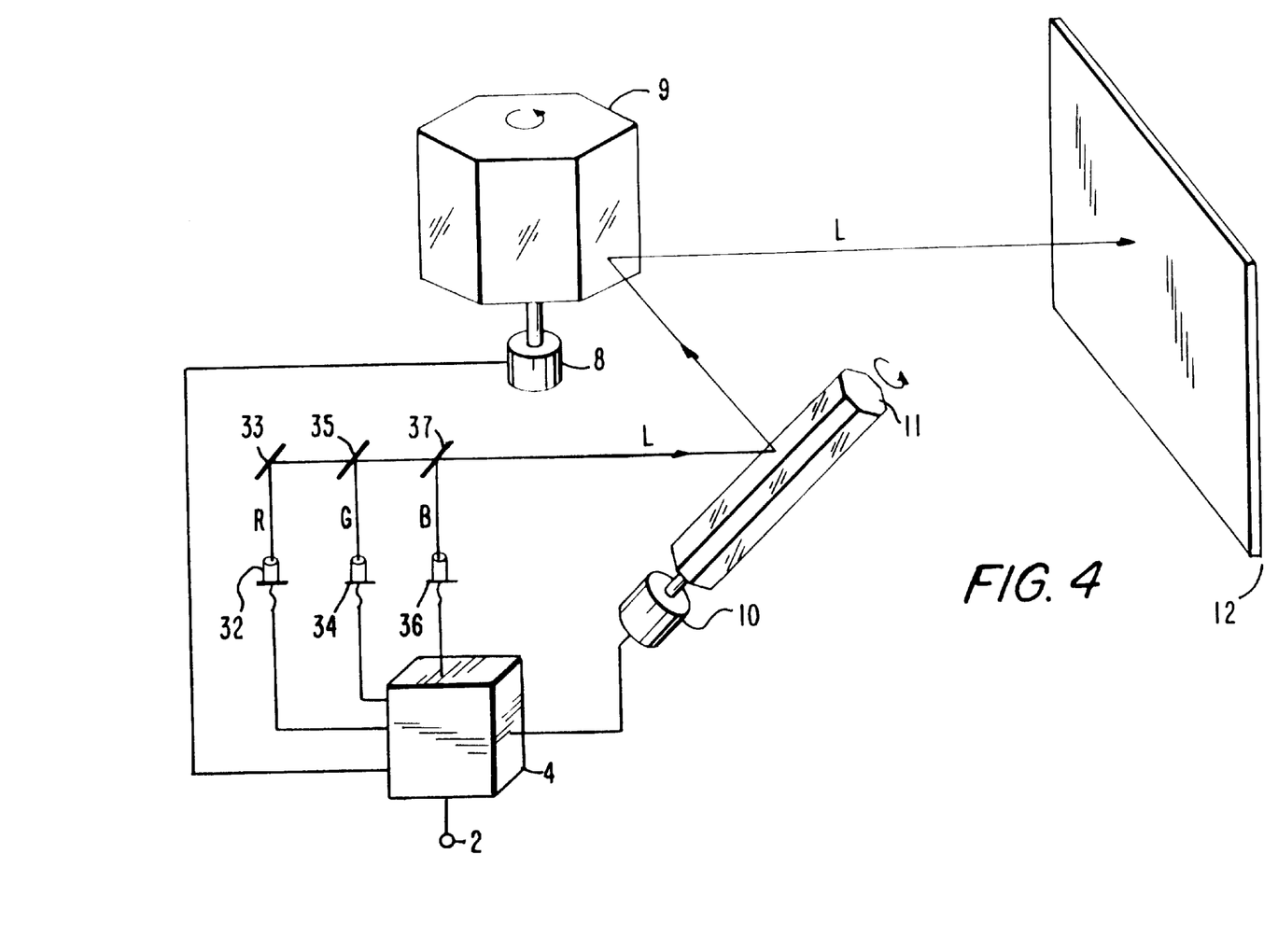
FIG. 4 shows a projection video display apparatus according to a fourth embodiment of the present invention.

FIG. 4 shows a fourth embodiment of the present invention. Here the laser diode 6 of the first embodiment is replaced by a system of three laser diodes 32, 34 and 36 to produce a projected color video image on the screen 12.

Lasers 32, 34 and 36 emit a red, a green, and a blue beam, respectively. These beams are directed toward a mirror 33 and half-silvered mirrors 35 and 37, respectively. Thus, beams R, G, and B are combined to produce a beam L.

The controller 4 modulates the intensity of lasers 32, 34 and 36, thereby determining the color of beam L in response to a video signal input at terminal 2.

The controller 4 causes the rotating mirrors 9 and 11 to scan the beam across the viewing surface 12, as described relative to the first embodiment.

For applications where greater beam intensity is required, for example large outdoor displays, the laser diodes 32, 34 and 36 are replaced with continuous-wave lasers. The red laser diode 32 could be replaced with a Helium Neon laser, for example, emitting a red beam at a wavelength of 630 nm. The green laser diode 34 could be replaced with a Nd:YAG laser and frequency doubling crystal, for example, to generate a green beam at a wavelength of 532 nm. The blue laser diode 36 could be replaced with an Argon laser, for example, to generate a blue beam with a wavelength of 488 nm.

Figure 5:
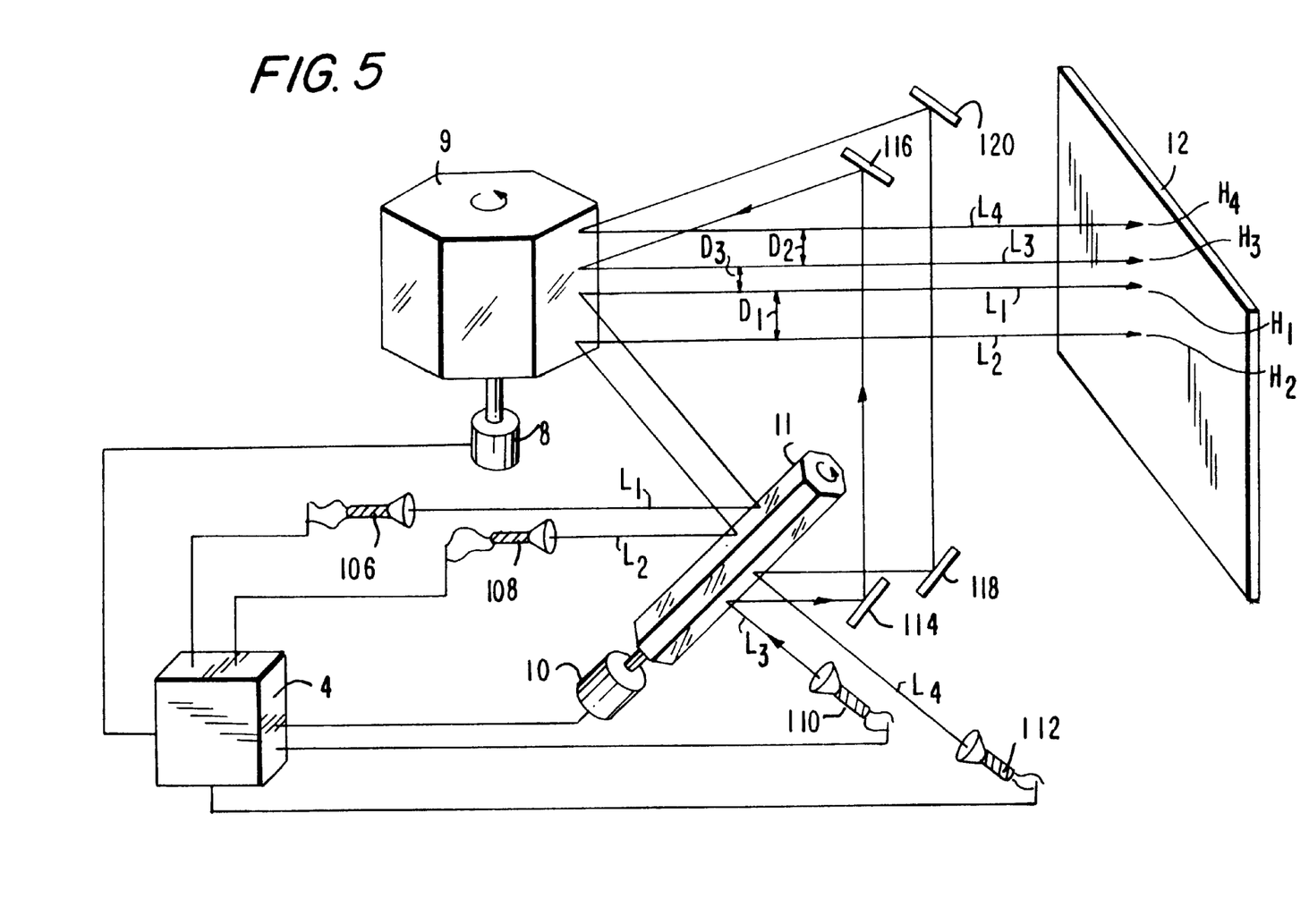
FIG. 5 shows a projection video display apparatus according to a fifth embodiment of the present invention.

FIG. 5 shows an fifth embodiment of the present invention. Four solid state lasers 106, 108, 110, and 112 are driven by a controller 4. Beams $L_1$ and $L_2$ from lasers 106 and 108, respectively, are directed toward a vertical scanning mirror 11, then to horizontal scanning mirror 9 and then to the viewing surface 12. Because the beams $L_1$ and $L_2$ are separated by a distance $D_1$, when they are scanned across the viewing surface 12 they will produce two horizontal scan lines $H_1$ and $H_2$, respectively. Lasers 110 and 112 are directed toward a second surface of the vertical scanning mirror 11. The beams $L_3$ and $L_4$ produced by lasers 110 and 112, respectively, are separated by a distance $D_2$. Beams $L_3$ and $L_4$ are reflected from mirrors 114 and 118, then mirrors 116 and 120, respectively. The beams $L_3$, $L_4$ are reflected from the horizontal scanning mirror 9 toward the viewing screen 12 producing horizontal scan lines $H_3$ and $H_4$. Mirrors 114, 116, 118, and 120 are arranged so that beams $L_1$, and $L_3$ are separated by a distance $D_3$.

Rotation of the horizontal scanning mirror 9 causes the four beams $L_1$, $L_2$, $L_3$, and $L_4$ to traverse the viewing surface 12 along scan lines $H_1$, $H_2$, $H_3$, and $H_4$, respectively.

The controller 4 modulates lasers 106, 108, 110, and 112 so that the intensity of the beams varies according to a video signal where four horizontal scan lines are displayed simultaneously. As a result, an NTSC video signal can be displayed by rotating a sixteen-sided horizontal scan mirror 9 at one quarter of the rate calculated using a single beam, approximately 154 rotations per second.

Figure 6:
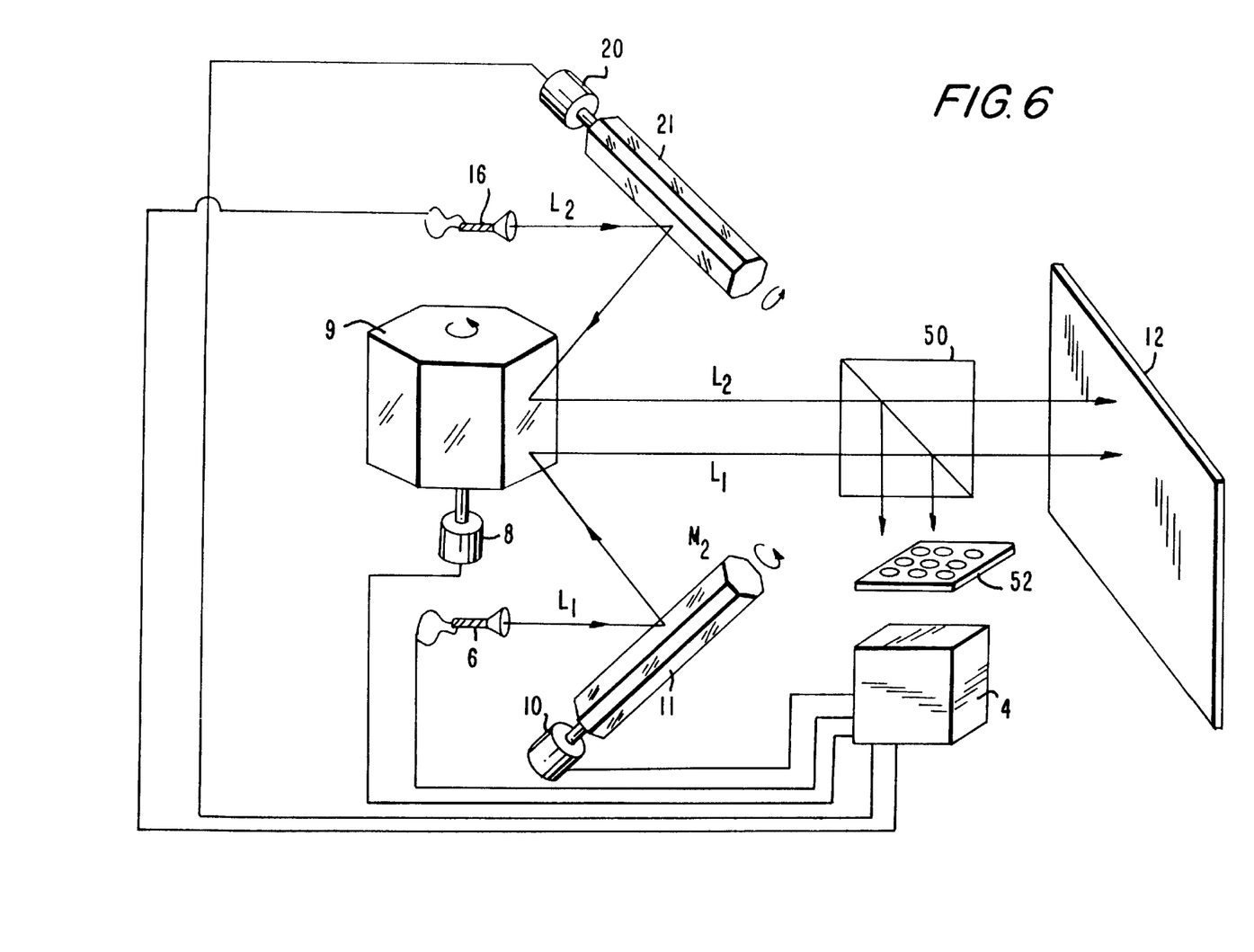
FIG. 6 shows a projection video display apparatus according to a sixth embodiment of the present invention.

FIG. 6 shows a sixth embodiment of the present invention where a controller 4 automatically calibrates the rotational positions of rotating mirrors 9, 11, and 21.

The controller 4 causes laser diodes 6 and 16 to emit continuous beams $L_1$ and $L_2$, respectively. These beams pass through a beam splitter 50 before traveling to the viewing surface 12. Some of the light from the beams $L_1$ and $L_2$ is directed downward toward a sensor array 52.

The controller 4 monitors the output of the sensor array 52 and adjust the relative rotational positions of the rotating mirrors 9, 11, 21 so that beams $L_1$ and $L_2$ are scanned across the viewing surface 12 in a predetermined pattern corresponding to scan lines of a given video signal format.

The embodiments described above are illustrations of the present invention. Those skilled in the art can vary the above embodiments while remaining within the spirit and scope of the present invention that is defined by the appended claims.

What is claimed is:

1. A display apparatus comprising:

a laser light source for producing a laser beam with a modulated intensity;

a first rotating mirror having a first plurality of faces for reflecting said laser beam and scanning said beam through a first predetermined range of angles at a first rotation rate;

a second rotating mirror having a second plurality of faces for receiving said laser beam reflected from said first rotating mirror through said first range of angles and for reflecting said laser beam and scanning said beam through a second predetermined range of angles at a second rotation rate;

a viewing surface disposed to receive said laser beam having been twice reflected; and control means for modulating said intensity of said laser light source, for controlling said first and second rotation rates, and for controlling said laser light source to turn off said laser beam when said laser beam reaches a transition between two adjacent faces of said second plurality of faces of said second rotating mirror, whereby said viewing surface is illuminated by said laser beam having been twice reflected to form a sequence of pixels on said viewing surface in a series of parallel scan lines, a resolution and an aspect ratio of said series of scan lines conforming to a predetermined format.

2. The apparatus according to claim 1 wherein said first and second rotating mirrors each comprise a motor.

3. The apparatus according to claim 1 wherein said laser light source is a solid-state laser.

4. The apparatus according to claim 1 wherein said control means includes video input means for receiving a video signal, wherein the modulation of said laser intensity and rotation of said first and second mirrors correspond with said video signal, whereby said series of scan lines corresponds with horizontal scan lines of said video signal and said predetermined format corresponds with a format of said video signal.

5. The apparatus according to claim 1 further comprising a second laser light source and a third rotating mirror, whereby a laser beam from said second laser light source is reflected by said third rotating mirror and scanned through a third predetermined range of angles, said third rotating mirror causing said laser beam from said second laser light source to be received by said second rotating mirror at a point offset from said beam reflected by said first rotating mirror, said control means controlling said third rotating mirror, whereby said beams having been twice reflected from said first laser light source and said second laser light source scan simultaneous parallel lines across said viewing surface.

6. The apparatus according to claim 2 further comprising a second laser light source producing a second laser beam, disposed so that said second laser beam is parallel to said first laser beam and separated by a predetermined distance, whereby said second laser beam is reflected from said first rotating mirror and said second rotating mirror and scanned across said viewing surface in a second series of scan lines parallel to said series of scan lines of said first laser beam.

7. The apparatus according to claim 6 wherein said first laser beam and said second beam are reflected from a first facet of a plurality of facets of said first rotating mirror, and further comprising:

a third laser light source for producing a third laser beam disposed so that said third laser beam is reflected from a second facet of said first rotating mirror; and first fixed mirror means for reflecting said reflected third laser beam toward said second rotating mirror, whereby said third laser beam is scanned across said viewing surface in a third series of scan lines, said third series of scan lines being parallel to said series of scan lines of said first laser beam.

8. The apparatus according to claim 1 wherein said control means includes alignment means for adjusting a relative rotational angle between said first and second rotating mirrors, and further comprising:

a beam splitter disposed between said second rotating mirror and said viewing surface for deflecting a portion of the laser beam; and sensor array means connected to said control means for determining a position of said twice reflected beam on said viewing surface based on a position of said deflected portion of said laser beam, whereby said control means adjusts relative rotational angles of said first and second rotating mirrors so that said laser beam is scanned along said series of parallel scan lines.

* * * * *